(12) United States Patent  (10) Patent No.: US 7,123,257 B2
Sawada  (45) Date of Patent: Oct. 17, 2006

(54) COLORING INFORMATION ADDING METHOD AND APPARATUS, AND IMAGE PROCESSING METHOD AND APPARATUS

(75) Inventor: Yasuhiro Sawada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 10/209,632

(22) Filed: Jul. 31, 2002

(65) Prior Publication Data

US 2003/0052893 A1   Mar. 20, 2003

(30) Foreign Application Priority Data

Jul. 31, 2001 (JP) .............. 2001-231427
Aug. 30, 2001 (JP) .............. 2001-261683

(51) Int. Cl.
*G06T 17/00* (2006.01)
(52) U.S. Cl. ............ 345/420; 345/419; 382/276; 382/285
(58) Field of Classification Search ........... 345/419, 345/420; 382/276, 285
See application file for complete search history.

(56) References Cited

U.S. PATENT DOCUMENTS 5,011,265 A  4/1991 Tamamura et al. .......... 350/173

5,719,702 A  2/1998 Decker .................. 359/487
6,400,373 B1 * 6/2002 Uchiyama et al. .......... 345/629

FOREIGN PATENT DOCUMENTS

JP  2614117  2/1997
JP  11-52287  2/1999

* cited by examiner

*Primary Examiner*—Kee M. Tung
*Assistant Examiner*—Tam Tran
(74) *Attorney, Agent, or Firm*—Morgan & Finnegan, LLP

(57) ABSTRACT

A method for adding coloring information to a solid model of an actual object includes the steps of acquiring a solid model for forming a surface shape of the object from a set of multiple planes, and estimating coloring information at the plane, wherein the estimating step comprises the steps of regularly arranging multiple coloring points on the plane, and calculating coloring information of the coloring point as a constant in a predetermined function based on photo-image data photographed of the object illuminated by a light source and photography information of the photo-image data, and storing the calculated constants as a two-dimensional array corresponding to an arrangement of the coloring point.

20 Claims, 10 Drawing Sheets

COLORING INFORMATION ADDING METHOD AND APPARATUS, AND IMAGE PROCESSING METHOD AND APPARATUS

BACKGROUND OF THE INVENTION

The present invention relates to three-dimensional computer graphics generation techniques for generating model data necessary for computer graphics ("CG") indicative of an actual object for, and more particularly to a method and apparatus for adding coloring information to a solid model. Also, the present invention relates to image processing apparatuses and methods, and more particularly to an image processing apparatus and method that provide higher quality model data necessary for the CC indicative of an actual object.

Along with the recent progress of information technologies, computer-aided image processing is put into active practice, and in particular, image processing technology using the CG has high potential applications to various fields, thus attracting attentions. One conventional method for reproducing an actual object or target using the CO is, as disclosed in Japanese Laid-Open Patent Application No. 2000-348213, a technique to paste actual object images taken by a camera onto various parts of the solid model. This technique prepares many multi-directionally photographed images for various CG's eye points, and selects and paste suitable images, thus generating the CG at the time of reproduction.

However, this method has a disadvantage in that it cannot illuminate the CG-reproduced object with illumination different than that has been used to take its image. As camera images originally include shades and highlights, the object that pastes camera images when provided with additional shades and highlights would become an unnatural image.

Accordingly, as disclosed in "Object Shape and Reflectance Modeling from Observation", pages 379–387 of SIGRAPH Computer Graphics Proceedings, Annual Conference Series of 1997, one method introduces a function model to handle changes in reflectance due to lighting and eye directions, and to express reflection model constants.

Even comparatively small amount coloring information content would enable natural shades and highlights to be reproduced with an arbitrary illumination condition and an arbitrary eye direction by storing as reflection model constants reflection property of coloring points arranged on a surface of a solid model, and substituting the constants for a reflection model function at a reproduction time. As represented by Phong's reflection model, many reflection models regards a light reflection as a linear sum of a diffuse reflection component and a specular reflection component, each of which is represented by multiple parameters. It is possible to estimate a reflection model parameter by using a set of images taken by changing lighting and eye directions.

Nevertheless, the above reflection model constant is estimated for each coloring point by using a group of images taken by changing lighting and eye directions. Thus, a reproduction of fine designs on the object surface requires reflection model constants to be calculated for coloring points sufficiently densely arranged on the model surface, and to be recorded with the coordinates of the coloring points. Disadvantageously, this would increase coloring information content and cause enormous calculations for estimate and reproduction.

In addition, the conventional methods cannot provide CG images with sufficient shades or highlights, or high quality CG images. For example, a specular reflection component has limited observing directions, and it was difficult to fully measure specular reflections on respective surface parts of the object having various normal directions. Thus, it has been disadvantageous that a specular reflection constant cannot be properly estimated for such parts whose specular reflections are not fully observed. As a result of utmost efforts to this problem, the present inventor has discovered that most of the actual objects often present, even when their base colors delicately change due to patterns and printing, similar materials and surface finishes within a permissible range. In other words, this range presents the same specular reflections, although exhibits different diffuse reflection depending on the base color. In addition, since quality sensation and glossy sensation are perceived in accordance with a state of highlight extent, a difference in specular reflections in a fine area is hard to be perceived.

BRIEF SUMMARY OF THE INVENTION

Accordingly, it is an exemplified object of the present invention to provide a method and apparatus that provides small information content for coloring information for natural CG reproduction of an object.

Another exemplified object of the present invention is to provide an image processing apparatus and method for generating model data usable for CG images, which may produce high quality CG images by estimating appropriate specular reflection constants even when an object surface has part whose specular reflection constants have not been fully observed.

A coloring information adding method as an aspect of the present invention includes the steps of acquiring a solid model for forming a surface shape of the object from a set of multiple planes, and estimating coloring information at the plane, wherein the estimating step includes the steps of regularly arranging multiple coloring points on the plane, and calculating coloring information of the coloring point as constants in a predetermined function based on photo-image data photographed of the object illuminated by a light source and photography information of the photo-image data, and storing the calculated constants as a two-dimensional array corresponding to an arrangement of the coloring point. This method regards a surface shape of an object as a set of planes, and regularly arranges coloring points on the plane, which provide coloring information. Thereby, it is unnecessary to retain a coordinate for each point.

The photography information may include information on an illumination method, which includes a lighting direction and illuminance, information about a method for the photographing device, and information on positions and postures about the photographing device, the object, and the light source. The photo-image data may be a set of images including multiple images photographed such that lighting and/or observation directions relative to the object is different. The predetermined function may include a lighting direction, an observation direction for photographing, and the constants as an element of the predetermined function. The predetermined function may be expressed by a linear sum of a diffuse reflection component and a specular reflection component, and the constants are a diffuse reflection constant related to the diffuse reflection component and a specular reflection constant related to the specular reflection component.

At least one of the lighting direction, the observation direction and the illuminance in the photography information may be approximated as a common value to coloring points in the plane. Thereby, when the plane is sufficiently small than a distance up to the light source and observation point, at least one of the lighting direction, the observation direction and the illuminance is approximated by the same predetermined value in all the coloring points on the plane, and an amount of calculations may be reduced. The common value may be a value of the lighting direction, the observation direction and the illuminance at a gravity center or at a point regarded as the gravity center on the plane. The common value may be an integral or average value of the lighting direction, observation direction or illuminance on the plane. The common value may be a value of the lighting direction, observation direction or illuminance at a representative point on the plane. The lighting direction, the observation direction and/or the illuminance in the photography information may be approximated by an interior division value of representative points on the plane. When the plane may be polygonal, the representative points are each vertices of the polygon.

The storing step may store the diffuse reflection constants into the two-dimensional array, and a common value as a specular reflection constant is stored in one plane. The storing step stores the diffuse reflection constants into the two-dimensional array, a common value as a specular reflection constant is stored in the multiple planes. In most of the actual objects, even when the base color slightly changes due to patterns and printing, materials and surface finishes are in many cases the same within a permissible range. In this range, diffuse reflection differs depending on a base color, but specular reflections are the same. Since quality sensation and glossy sensation are perceived in accordance with a state of highlight extent, a difference in specular reflections in a minute area is hard to be perceived. Utilizing this fact, a coloring information adding apparatus of an aspect of this invention calculates so as to have the same specular reflection constants in one or more planes where materials and surface finishes are the same. The diffuse reflection constant is provided with each coloring point regularly arranged in many numbers on each plane. As a result, only a set of specular reflection constants may be preserved in a plane, while fine patterns and designs may be reproduced using the two-dimensional array of the diffuse reflection constant since a specular reflection constant may be estimated once for each polygon, an amount of calculations needed for estimation can be reduced.

The common value as the specular reflection constant may correspond to a representative value of the lighting direction, observation direction and illuminance, and a representative value of brightness of an image. The representative value of the lighting direction, observation direction, and illuminance may be a common value to coloring positions in the plane. The representative value of the brightness of the image may be a value obtained by integrating or averaging the brightness of the image in the photo-image data onto a projection area of the plane. The diffuse reflection constant stored at the coloring point may be calculated using a value of the specular reflection constant.

The storing step may store the diffuse reflection constants into the two-dimensional array, and values at representative points in the plane for the specular reflection constant. The diffuse reflection constant stored in the coloring point may be calculated by interior-dividing the specular reflection constant at the representative points. When the plane is polygonal, the representative points may be respective vertices of the polygon. When a projection transformation is performed only for vertices of a plane, a computation amount can be curtailed because the projection transformation to an individual point comes off with a simple linear transformation. As a result, the processing performance may be enhanced.

In the above method, the plane in the solid model may be established such that it does not extend over different materials or different surface finishes on the surface of the object.

An apparatus of another aspect of the present invention for adding coloring information to a solid model of an object includes a photo-image acquisition section for acquiring photo-image data of the object illuminated by a light source, a photography information acquisition section for acquiring image-related information on the photo-image data, a solid model acquisition section for acquiring a solid model whose surface shape of the object is formed from a set of multiple planes, and a coloring information estimation section for estimating coloring information at the plane based on the photo-image data and the image-related information. Such an apparatus may execute the above coloring information adding method, and exhibit operations similar to those of the above method.

An image processing method of another aspect of the present invention includes the steps of adding coloring information using the above method, preparing a three-dimensional computer graphics from added coloring information, and displaying a prepared three-dimensional computer graphics. Such a processing method includes the above coloring information adding method, and exhibits similar operations.

A computer program of another aspect of the present invention includes the above coloring information adding method as well as a computer program that may run a three-dimensional information processing method.

An image processing apparatus of another aspect of the present invention includes a photo-image acquisition section for acquiring photo-image data of the object illuminated by a light source, a photography information acquisition section for acquiring photography information on the photo-image data, a solid model acquisition section for acquiring a solid shape forming a surface shape of the object from a set of multiple planes, a coloring information estimation section for estimating coloring information at the plane based on the photo-image data and the photography information, a producer for producing a three-dimensional computer graphics by using the coloring information added by the coloring information estimation section, and a display for displaying a generated three-dimensional computer graphics. This apparatus includes the above coloring information adding apparatus, and exhibits operations similar to those of the apparatus.

An image processing apparatus of another aspect of the present invention for generating three-dimensional computer graphics data from an actual object includes an photo-image data acquisition section for taking photo-image data of the object, an area divider for dividing a surface of the object into multiple areas by regarding areas as the same group which are made of the same material and/or same surface finish on the surface of the object, and a coloring information estimation section for generating coloring information of the object, and for generating coloring information of the same specular reflections to areas in the same group on the surface of the object. This image processing apparatus groups an object surface having the same material and surface finish into multiple areas, and computes such that they have the same specular reflection parameters. This may provide the specular reflection even when there is part whose specular reflection has not been fully observed only if there is part in the same group whose specular reflection has been fully observed. Further, grouping multiple points in different normal directions would diversify lighting and observation directions, which is expected to have the same effect as the increased number of images. This may produce model data that will provide high quality CG images.

The image processing apparatus may further include a photography information acquisition section for acquiring photography information when the photo-image data acquisition section photographs the object. This may provide the coloring information estimation section with photography information. The image processing apparatus may further include a solid model acquisition section for acquiring a solid model of the object. This may provide the coloring information estimation section with a solid model.

The image processing apparatus may further include a photography information estimation section for using photo-image data photographed by the photo-image data acquisition section to estimate information about an arrangement of a light source, an arrangement of the object, and an arrangement of a camera when the photo-image data acquisition section photographs the object. Such a photography information estimation section may supersede the above photography information acquisition section, thus exhibiting similar operations.

The image processing apparatus may further include a solid model estimation section that uses photo-image data photographed by the photo-image data acquisition section and photography information acquired by the photography information acquisition section to estimate a solid shape of the object. This solid model estimation section may supersede the above solid model acquisition section, exhibiting similar operations. The image processing apparatus may further include a solid model estimation section for using photo-image data photographed by the photo-image data acquisition section and information on an arrangement of the object and an arrangement of a camera estimated by the photography information estimation section to estimate a solid model of the object. Such a solid model estimation section may supersede the above solid model acquisition section, performing similar operations. The image processing apparatus may further include a solid model input section for getting a solid model of an object by receiving an input from a user, by reading out of a recording medium for storing an solid model prepared by an external apparatus, and by receiving from the external apparatus via communications. Such a solid model input section can supersede the above solid model acquisition section and the solid model estimation section, exhibiting similar operations. This structure is suitable for the object that has known solid shape, e.g., such as an industrial product and the like.

The image processing apparatus may further include a model data storage for storing the solid model and coloring information of the object. This storage may store data, thus enabling such data to be repeatedly used at multiple CG producer and displays.

The image processing apparatus may further include a producer for producing three-dimensional computer graphics, and a display for displaying the three-dimensional computer graphics prepared. Thus, the inventive image processing apparatus may be configured to produce only model data used to simply generating CG images, or produce and display three-dimensional computer graphics. The producer may determine displaying colors by substituting for a reflection model function, constants in coloring information, and illuminance, lighting direction and observation direction calculated based on a solid model and information on a camera and light source arrangement per coloring point whose coloring information has been described, using the coloring information and the solid model stored in the model data storage.

The photo-image data may include a set of a sequence of images of the object photographed from different lighting and observation directions. The coloring information producer may use multiple coloring points to represent the area divided by the area divider, and generates coloring information on the multiple coloring points. The photography information acquisition section may record information on an arrangement among a light source, an object and a camera in photographing photo-image data. The solid model acquisition section may include a depth measuring mechanism such as a range finder. The coloring information estimation section may generate coloring information of the surface of the object as reflection model constants in a reflection model function. The reflection model function may include, as function elements, a normal direction of the surface of the object, lighting and observation directions in photographing the object, and multiple reflection model constants. The reflection model function may be expressed by a linear sum of a diffuse reflection component and a specular reflection component, and the reflection model constants basically include two groups of diffuse reflection constants related to diffuse reflection components and specular reflection constants related to specular reflection components.

An image processing system of still another aspect of the present invention includes the above image processing apparatus, wherein the image processing apparatus includes a plurality of separate devices, among which data can be sent to and received from one another via an information recording medium, or wire or wireless communication means.

An image processing method of another aspect of the present invention for generating three-dimensional computer graphics data from an actual object includes the steps of acquiring photo-image data of the object, dividing a surface of the object in multiple areas by regarding as the same group areas made of the same material and/or same surface finish on the surface of the object, and generating coloring information of the object, wherein the generating step generates coloring information of the same specular reflections for areas in the same group on the surface of the object. Such an image processing method is a method executed by running the above image processing apparatus, exhibiting operations similar to those of the above apparatus. However, this method is not limited to the above apparatus, and exhibits similar operations when executed.

The image processing method may further include the step of acquiring photography information in acquiring photo-image data. The image processing method may further include the step of acquiring a solid model of the object. The image processing method may further include the step of estimating an arrangement of a light source, an arrangement of the object, and an arrangement of a camera in photographing the object, by using photo-image data photographed at the photo-image data acquisition step. The image processing method may further include the step of estimating a solid shape of the object by using photo-image data photographed at the photo-image data acquisition step, and photography information acquired at the photography information acquisition step. The image processing method may further include the step of estimating a solid model of the object by using photo-image data photographed at the photo-image data acquisition step, and information on an arrangement of the object and an arrangement of a camera estimated at the information estimation step. The image processing method may further include the step of getting a solid model of the object by receiving an input from a user, reading in from a recording medium for storing a solid model prepared by an external apparatus, and receiving from the external apparatus via communication. The image processing method may further include the step of storing the solid model and coloring information of the object. The image processing method may further include the steps of generating three-dimensional computer graphics, and displaying the generated three-dimensional computer graphics. The three-dimensional computer graphics generation step may include the step of determining displaying colors by substituting for a reflection model function, constants in coloring information, and illuminance, a lighting direction and an observation direction calculated based on solid model and information on an arrangement of a camera and a light source per coloring point whose coloring information has been described, using the solid model and coloring information stored at the storing step. These methods may exhibit operations similar to the above apparatus.

A computer program of another aspect of the present invention runs the above image processing method.

Other objects and further features of the present invention will become readily apparent from the following description of the embodiments with reference to accompanying drawings.

DETAILED DESCRIPTION OF THE PREFERRED EMBODIMENTS

Figure 1:
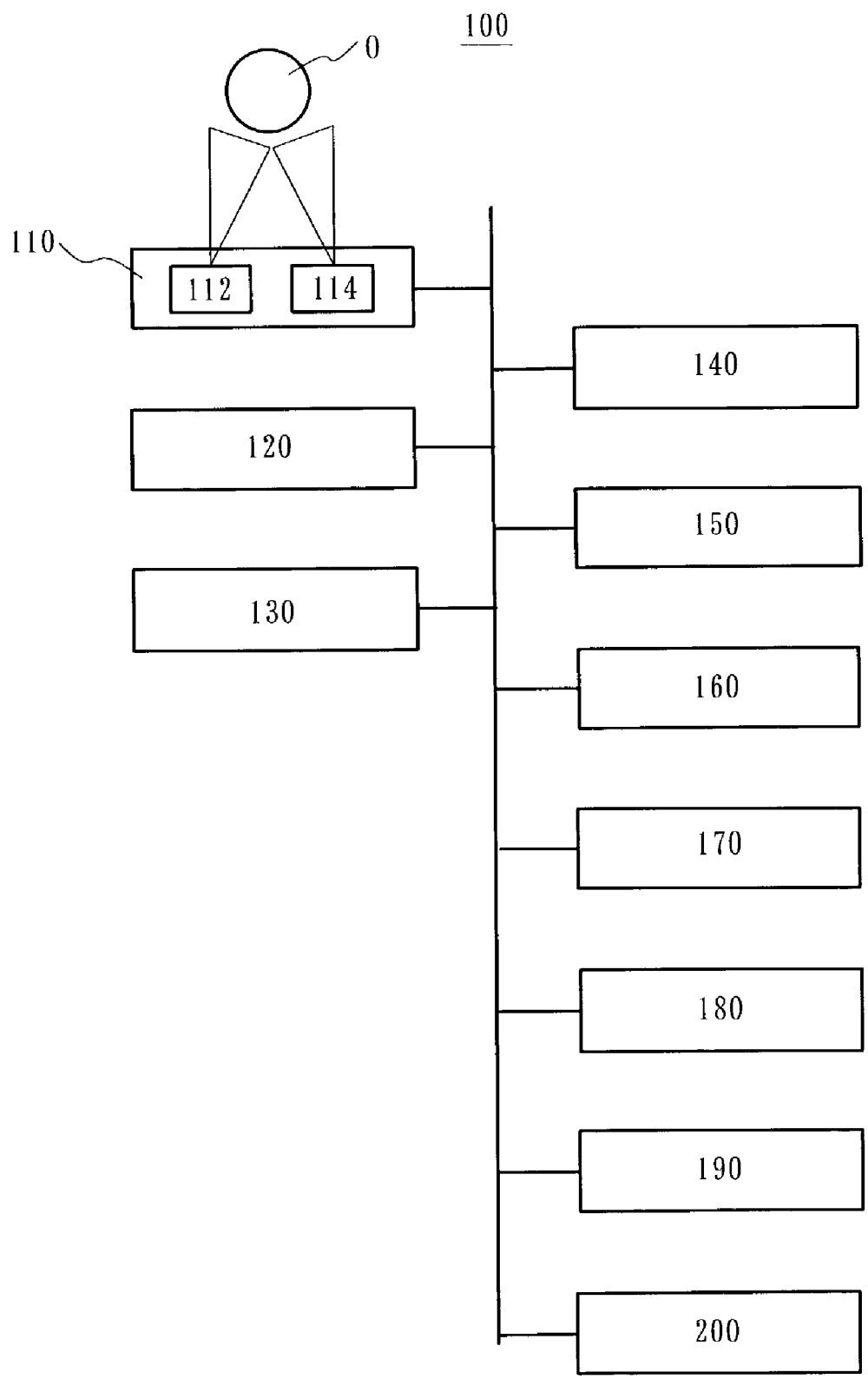
FIG. 1 is a schematic diagram showing a three-dimensional image processing apparatus of one embodiment as one aspect of the present invention.
Figure 2:
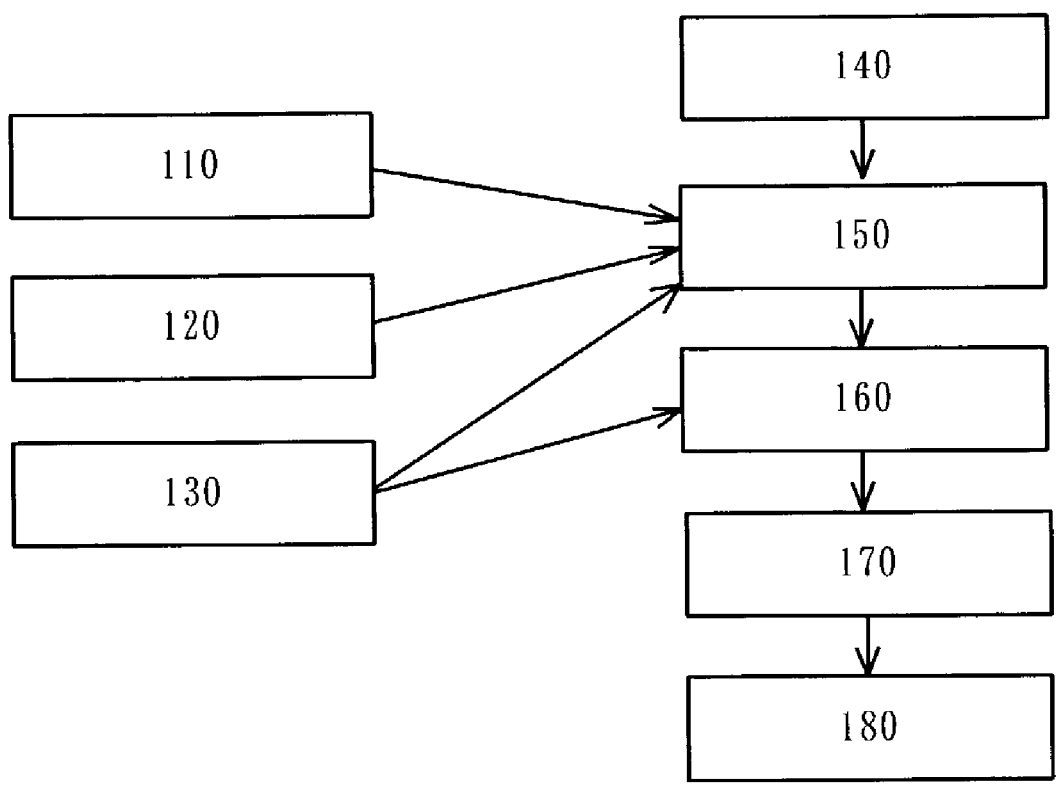
FIG. 2 is a schematic block diagram showing the three-dimensional image processing apparatus shown in FIG. 1.

A description will now be given of a three-dimensional image processing apparatus 100 as an aspect of the present invention referring to accompanying drawings. The same reference numeral in each figure denotes the same element. Here, FIG. 1 is a schematic diagram showing an exemplary form of the three-dimensional image processing apparatus 100 as an aspect of the present invention. FIG. 2 is a schematic block diagram showing the three-dimensional image processing apparatus shown in FIG. 1. In FIG. 2, a controller 190 and a memory 200 shown in FIG. 1 are omitted.

Figure 11:
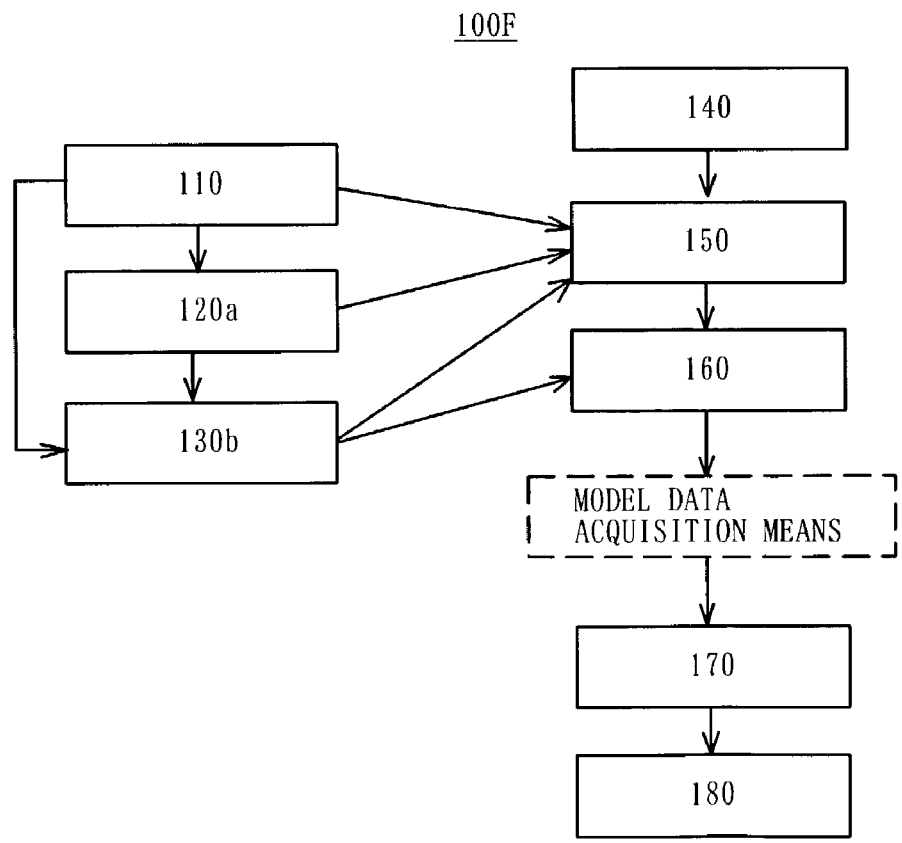
FIG. 11 is a block diagram showing a variation of the three-dimensional image processing apparatus shown in FIG. 2.

The inventive three-dimensional image processing apparatus 100 includes an photo-image data acquisition section 110, a photography information acquisition section 120, a solid model acquisition section 130, an area divider 140, a coloring information estimation section 150, a model data storage 160, a CG producer 170, a CG display 180, a controller 190, and a memory 200. As shown in FIG. 1, the respective components in the three-dimensional image processing apparatus 100 are structured so that they can transfer data to and receive data from one another via, for example, a bus. Although the three-dimensional image processing apparatus 100 of this embodiment may produce and display the CG, the inventive apparatus may serve as an apparatus that prepares model data needed for use with the CG when the CG producer 170 and CG display 180 are provided as separate apparatuses as shown in FIG. 11 described later.

Figure 3:
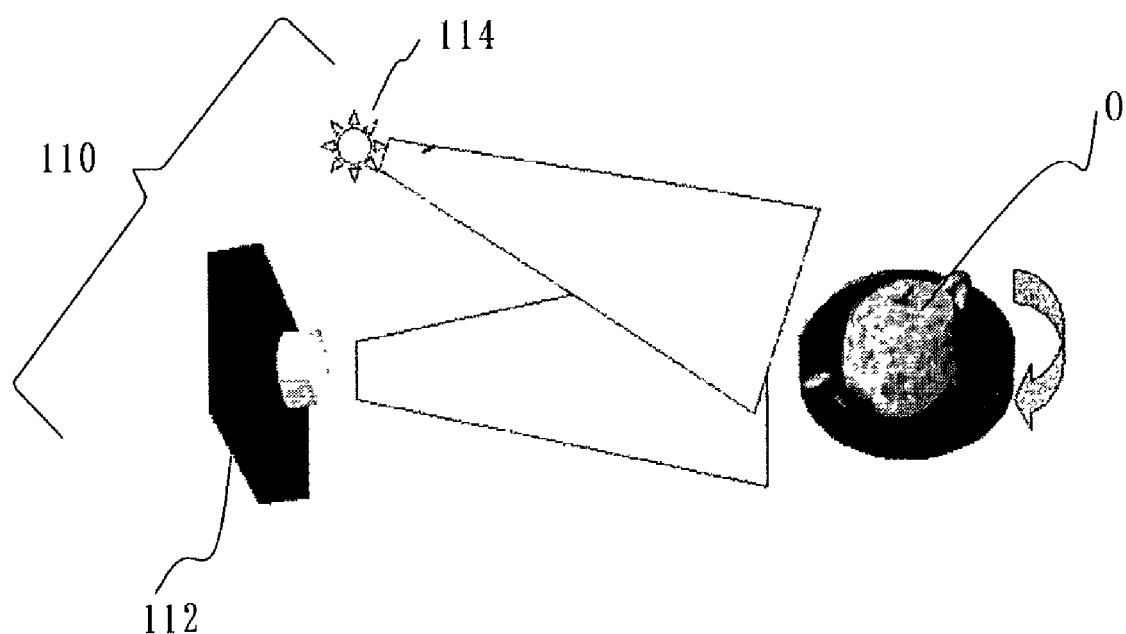
FIG. 3 is a schematic view showing a photo-image data acquisition section and an object O shown in FIG. 1.

The photo-image data acquisition section 110 acquires photo-image data of an object O. More specifically, the photo-image data acquisition section 110 obtains multiple pieces of photo-image data of the object O photographed with a differently arranged light source 114 (or lighting direction) and a differently arranged imaging apparatus 112 (or photographing and observation directions), which will be described later. In this embodiment, the photo-image data acquisition 110, which includes an imaging apparatus 112 and light source 114, acquires photo-image data of the object O by photographing the object O with the imaging apparatus 112 that is illuminated by the light source 114. As shown in FIG. 3, this embodiment mounts the object O onto a rotary stage that can turn around a normal direction of a plane for mounting the object O, as a rotational axis. Here, FIG. 3 is a schematic diagram showing the photo-image data acquisition section 110 and the object O. The imaging apparatus 112 and light source 114 vary an angle (i.e., a photographing position) relative to the object O singly or in combination in one direction, and may acquire multiple photo-image data with different photographing environments. The imaging apparatus 112 and light source 114 are fixed onto, for example, a tripod and change the illumination and photographing (and observation) directions by changing the height of the tripod. An alternative method automatically changes angles of the imaging apparatus 112 and light source 114 every photograph by using the control part 180 to control the imaging apparatus 112 and light source 114 connected to another moving mechanism (not shown).

The imaging apparatus 112 includes, e.g., a color CCD camera, which acquires (or photographs) photo-image data of three RGB color bands. However, the imaging apparatus 112 of the photo-image data acquisition section 110 is not limited to this, and may be one that acquires (or photographs) photo-image data of a single color including binary monochrome or of other colors. The imaging apparatus 112 may output this photo-image data through the above bus to the coloring information estimation section 150. The imaging apparatus 112 is known to those skilled in the art, and a detailed description thereof will be omitted.

The light source 114 illuminates, for example, the object O with a point light source. The light source 114 may apply any illumination apparatus (for photographing) known in the art, and thus a detailed description thereof will be omitted.

As far as the photo-image data acquisition section 110 serves to generate multiple photo-image data of the object O photographed in different light source and eye (photographing) directions, the imaging apparatus 112 and the light source 114 in this present invention may have any structures. The object O may be mounted on an apparatus having multiple rotary axes. This structure allows multi-directional photo-image data of the object O to be obtained even when the imaging apparatus 112 and light source 114 are fixed to specific locations, respectively. One alternative fixes the object O is fixed, and photographs the object while changing positions of the imaging apparatus 112 and light source 114. Another alternative photographs the object O and changes two or more positions of the imaging apparatus 112, light source 114 and object O.

Further, the inventive three-dimensional image processing apparatus 100 may omit the photo-image data acquisition section 100 by reading photo-image data that has been photographed by a photographing apparatus other than the imaging apparatus 112 of the photo-image data acquisition section 110 and then stored in a recording medium, such as a floppy disk (FD), CD, MO, etc., or by being connected to the apparatus for communication with it. The three-dimensional image processing apparatus 100 may structurally combine the capability of reading photo-image data stored in a recording medium with the photo-image data acquisition section 110.

The photography information acquisition section 120 acquires photograph environment information on photo-image data generated by the photo-image data acquisition section 110. The photography information acquisition section 120 is shown in FIG. 2 but not in FIG. 1. More specifically, the photography information acquisition section 120 acquires photograph environment information at the time of photographing, which includes light source information relating to the light source 114, imaging apparatus information relating to the imaging apparatus 112, an eye point, the object O, a position and orientation of the light source 114, an arrangement of a camera, the object O, the light source 114, and the brightness of the light source 114 at the time of photographing. As the photography information acquisition section 120 is configured to output information to the coloring information estimation section 150, acquired photography information may be output to the coloring information estimation section 150.

The photography information may be input to the photography information acquisition section 120 via an input device, such as a keyboard, by an operator (including a photographer or an operator of the three-dimensional image processing apparatus 100). In this case, the operator needs not only record arrangement of the apparatus 112, object O, light source 114 and the brightness of the light source 114, etc. at the time of photographing per image that the above photo-image data acquisition section 110 acquires, but also input them to the photography information acquisition section 120. When the photo-image data acquisition section 110 automatically photographs the object O under control by the controller 190, the photography information acquisition section 120 may acquire environment information at the time of photographing per image from the controller 190, or the controller 190 may directly output the environment information to the coloring information estimation section 150. The photography information acquisition section 120 may be configured to obtain photography information by reading it from a recording medium, such as a FD, CD, MO, etc., or by communicating with the external apparatus. Alternatively, it may have a structure that can selectively use these capabilities, the above input device (not shown) and the function of the controller 190.

Figure 4:
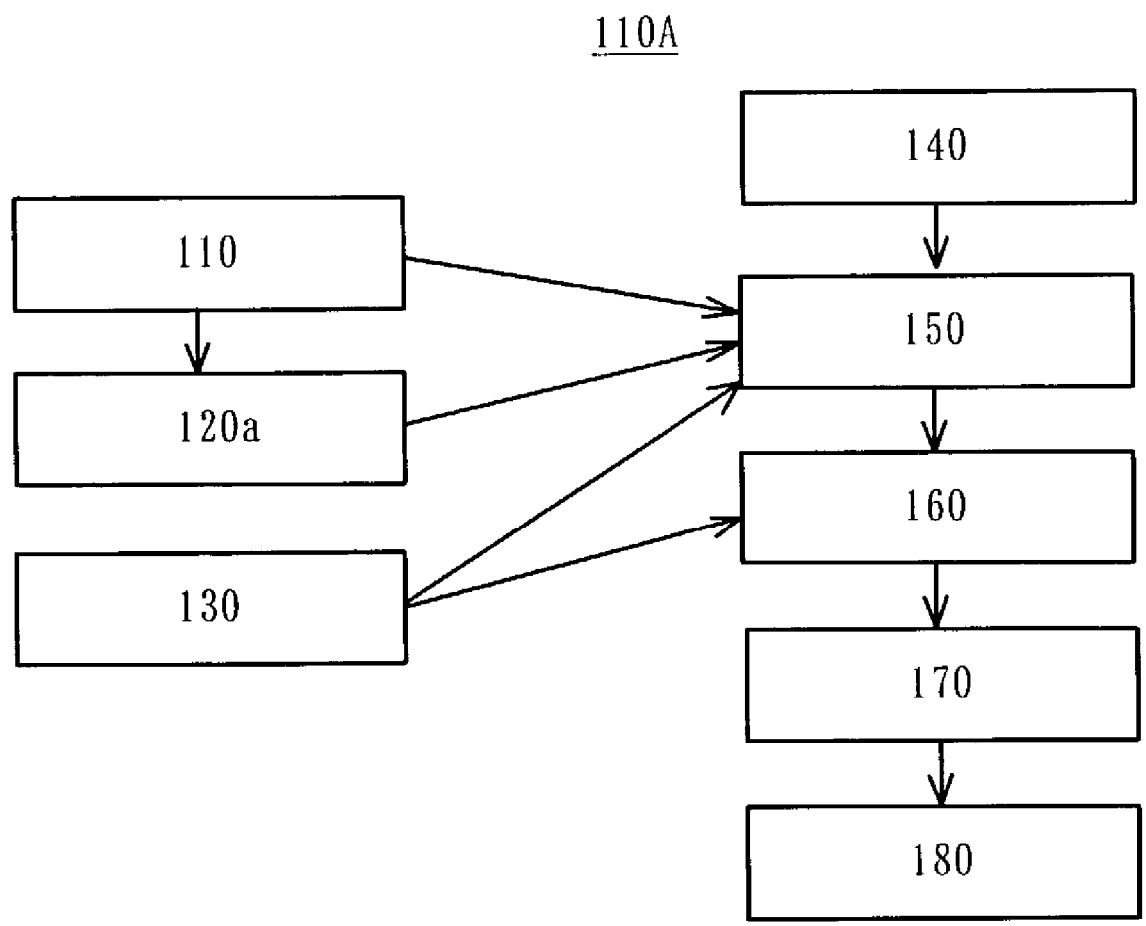
FIG. 4 is a schematic block diagram showing a variation of the three-dimensional image processing apparatus shown in FIG. 2.
Figure 7:
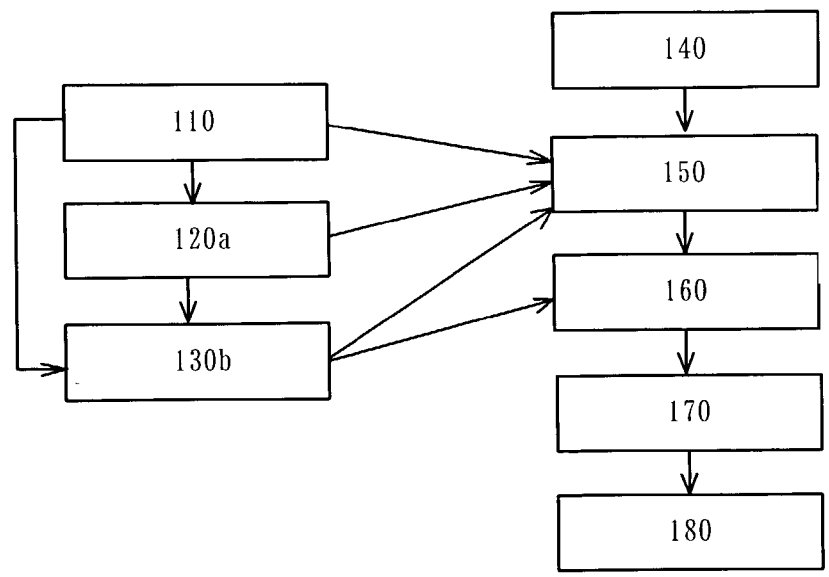
FIG. 7 is a schematic block diagram showing a variation of the three-dimensional image processing apparatus shown in FIG. 2.
Figure 8:
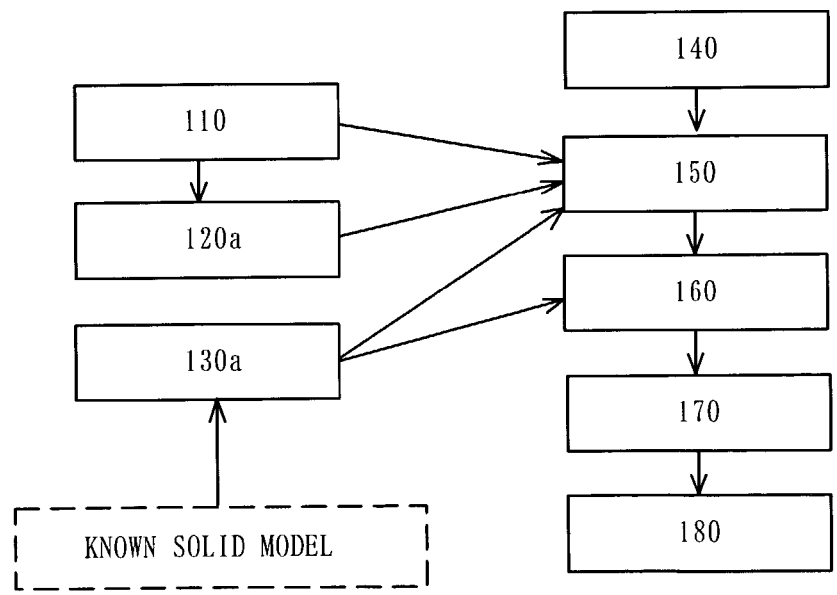
FIG. 8 is a schematic block diagram showing a variation of the three-dimensional image processing apparatus shown in FIG. 2.

The controller 190 may estimate part or all of the photography information, instead of recording at the photographing time, from photo-image data (or data) obtained by the photo-image data acquisition section 110. This configuration implements, as shown in FIGS. 4, 7, and 8 described later (although not shown in FIG. 1), the photography information acquisition section 120 as a photo-image data estimation section 120*a*. Given the photo-image data estimation section 120*a*, a marker fixed on the object O at the photographing time is configured to appear together with the object O. Alternatively, any featuring part on the object O may be used for the marker as a substitute. Then, photographing environment information may be estimated based on marker's position and color on a photographed image. An estimation method may apply a computation known as Huff conversion, but the present invention does not limit the estimation method to this type.

The solid model acquisition section 130 acquires a solid model. The solid model represents the surface shape of the object O using a set of multiple points or planes, thus preserving three-dimensional coordinates for giving locations of points or planes. The solid model acquisition section 130 uses a distance measuring mechanism that includes a range finder relative to a depth of the object O to measure the shape of the object O, and acquire a solid model. As the solid model acquisition section 130 is configured to output information to the coloring information estimation section 150 and model data storage 160, an acquired solid model (each plane) is output to the coloring information estimation section 150 and model data storage 160.

Figure 6:
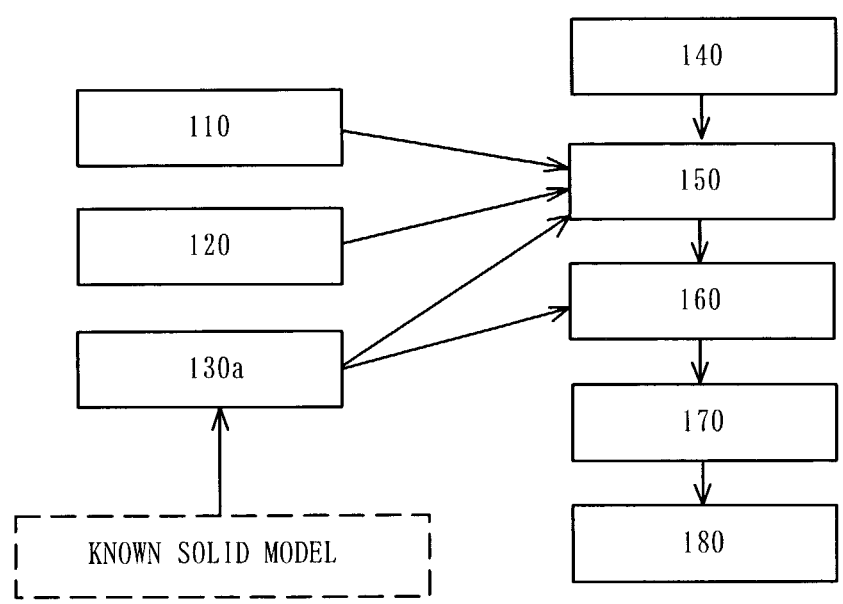
FIG. 6 is a schematic block diagram showing a variation of the three-dimensional image processing apparatus shown in FIG. 2.

The solid model may be input to the photography information acquisition section 120 via an input device, such as a keyboard, by an operator (including a photographer or an operator of the three-dimensional image processing apparatus 100). The solid model may be input by reading the solid model acquired by another apparatus and stored in a recording medium, such as a FD, CD, MO, etc., or by communicating with the other apparatus. This configuration may implement the solid model acquisition section 130 as a solid model input section 130*b*, as shown in FIGS. 6 and 7 described later (although not shown in FIG. 1).

Figure 5:
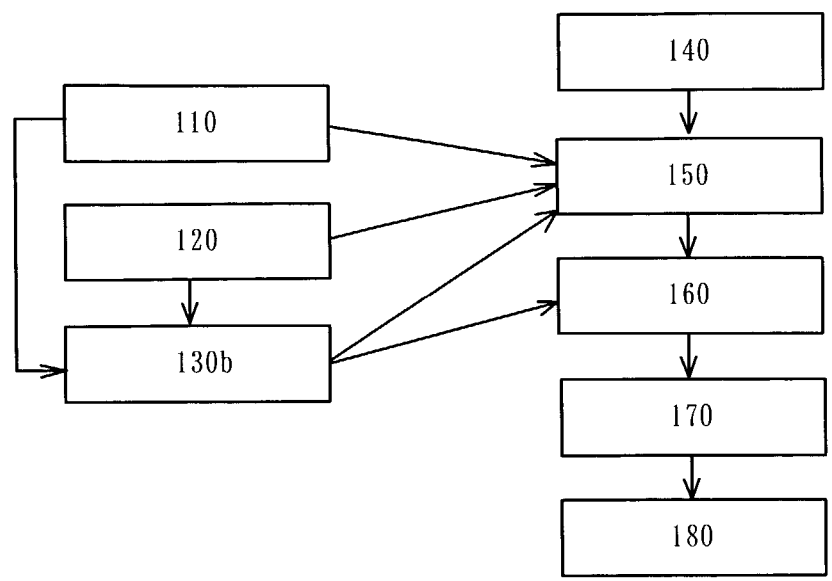
FIG. 5 is a schematic block diagram showing a variation of the three-dimensional image processing apparatus shown in FIG. 2.

Further, as described in another embodiment, the solid model may use a three-dimensional modeling based on multiple photo-image data photographed at multiple positions and photography information to obtain a solid model. In such a structure, as shown in FIGS. 5 and 7 (not shown in FIG. 1), the solid model acquisition section 130 can be implemented as a solid model estimation section 130*b*.

The area divider 140 divides the solid model surface into multiple areas, while classifying into the same group areas made of the same material and surface finish on a surface of a solid model obtained by the solid model acquisition section 130. As the area divider 140 is configured to output information to the coloring information estimation section 150, divided areas of the solid model are output to the coloring information estimation section 150.

The coloring information estimation section 150 estimates coloring information based on information input by each of the photo-image data acquisition section 110, the photography information acquisition section 120 (or the photography information estimation section 120*a*), the solid model acquisition section 130 (or the solid model input section 130*a* or the solid model estimation section 130*b*), and the area divider 140. As the coloring information estimation section 140 is configured to output information to the model data storage 160, estimated coloring information is output to the model data storage 160.

The coloring information estimation section 150 may generate such coloring information as a reflection model constant for the reflection model function. Such a reflection model function includes, as the function's elements, the normal direction on the object O surface, lighting direction of the light source 114, photographing (or observation) direction of the imaging apparatus 112 and multiple reflection constants. This reflection model function is expressed by a linear sum of a diffuse reflection component and a specular reflection component, and the reflection model constants are divided roughly into two groups—diffuse reflection constants related to the diffuse reflection component and specular reflection constants related to the specular reflection component. As apparent from a later description of an operation, the inventive coloring information estimation section 150 may calculate so that the areas in the same group divided from the object O's surface by the area divider 140 may have the same specular reflection constants. As a result, even when there is part whose specular reflection has not been fully observed on the object O's surface, specular reflection constants can be provided, if there is part whose specular reflection has been fully observed in the same group. In addition, grouping of multiple points whose normal directions would diversify lighting and photographing directions, which have the same effect as the increased number of images.

The model data storage 160 stores a two-dimensional array that stores a plane (or three-dimensional coordinate of plane vertexes for providing locations of the plane) acquired by the solid model acquisition section 130 and reflection model constants for all the coloring points on the entire plane processed by the coloring information estimation section 150. The model data storage 160 can utilizes various memories, or may be replaced by the above memory 200. As the model data storage 160 is configured to output information to the CG producer 170, the information is output to the CG producer 170.

Based on the information stored in the model data storage 160, the CG producer 170 generates photo-image data of the object O of various eye points and illumination environments as designated by an operator. The CG producer 170 may be implemented as a known CG producer, and thus a detail description thereof will be omitted.

The CG display 180 displays photo-image data generated by the CG producer 170. The CG display 180 may use various display devices such as CRT, LCD, etc. The CG display 180 may be implemented as a printer that may prints photo-image data.

The controller 190 may be any processor such as CPU, MPU, etc., regardless of its name, and control various components using operation programs stored in the memory 200.

The memory 200 includes a non-volatile memory, such as a ROM etc. for storing, for example, operation programs for the three-dimensional image processing apparatus 100 and various sorts of data needed for image processing, and a volatile memory, such as a RAM etc. for temporarily storing images and necessary control programs.

A description will now be given of the operation of the inventive three-dimensional image processing apparatus 100. As shown in FIG. 3, the object O is first placed on a rotary stage in a darkroom, and is illuminated with a point light source or a parallel light source by the light source 114. At the same time, the imaging apparatus 112 is directed to the object O. Then, while the rotary stage is being rotated, photo-image data including three RGB color bands is obtained at multiple angles by using the imaging apparatus 112. Thereby, the photo-image data acquisition section 110 may obtain photo-image data photographed by rotating the object O, while relatively changing the lighting and photographing directions and thus changing the lighting and eye directions. A change of an angle of the photo-image data acquisition section 110 relative to the object O would provide additional photo-image data. Such photo-image data is output to the coloring information estimation section 150. At this time, the photography information on an arrangement of a camera, subject, and a light source, the brightness of the light source, at the time of photographing, etc. need be recorded per image.

Although the above embodiment mounts the object O on the rotary stage, the object O may be photographed while mounted on an apparatus having multiple rotary axes. An alternative photograph may change positions and directions of the imaging apparatus 112 or light source 114, or positions of two or more of the imaging apparatus 112, light source 114 and object O. This step requires plural images which have different lighting and eye directions for the object O using positional changes and rotations.

The photography information acquisition section 110 acquires photography information on an arrangement of the light source 114, imaging apparatus 112, and object O, and on brightness of the light source 114 at the image photographing time for each image. As discussed, the photography information may be input by an operator, by an external apparatus, or given by the controller 190.

As shown in FIG. 4 but not in FIG. 1, if the photography information acquisition section 120 is replaced with the photography information estimation section 120a, part of the photographing environment information nee may be estimated from the photo-image data instead of being recorded at the image photographing time as discussed. Here, FIG. 4 is a schematic block diagram showing the three-dimensional image processing apparatus 100A as a variation of the three-dimensional image processing apparatus 100 shown in FIG. 1. In this case, the photographing environment information may be estimated from a positional or color change of a marker or its substitute feature fixed onto the object O at the image photographing time. The estimation method may use a computation known as Huff conversion method to estimate photography information. Any other estimation method is applicable, and thus a detailed description thereof will be omitted in this application.

The solid model acquisition section 130 acquires a solid model. In this case, as shown in FIG. 2, the solid model acquisition section 130 obtains a solid model from a shape measuring mechanism like a range finder etc., and passes the information to the coloring information estimation section 150 as well as storing it in the model data storage 160.

As shown in FIG. 5, when the solid model acquisition section 130 is implemented as the solid model estimation section 130b, it may provide three-dimensional modeling and estimate the solid model of the object O based on the multiple photo-image data that the photo-image data acquisition section 110 has photographed of the object O from multiple positions and the photography information that the photography information acquisition section 120 has obtained. Here, FIG. 5 shows a schematic block diagram showing a three-dimensional image processing apparatus 100B as a variation of the three-dimensional image processing apparatus 100 shown in FIG. 2.

As shown in FIG. 6, when the solid model acquisition section 130 is implemented as the solid model estimation section 130b, the solid shape data of the object O, as described above, is available when the solid model input section 130a receives a user's operation, reads a recording medium for storing solid shape data, or receives solid shape data from an external apparatus through wire or wireless communication means. Here, FIG. 6 is a schematic block diagram showing a three-dimensional image processing apparatus 100C as a variation of the three-dimensional image processing apparatus 100 shown in FIG. 2. This structure is suitable for the object O whose solid shape has been already known, e.g., such as an industrial product and the like.

As shown in FIG. 7, when the solid model acquisition section 130 is implemented as the solid model estimation section 130b and the photography information acquisition section 120 is implemented as the photography information estimation section 120a, part of the photographing environment information may be estimated from the photo-image data, instead of being recorded at the image photographing time. Three-dimensional modeling is available to estimate a solid model of the object O based on the multiple photo-image data that the photo-image data acquisition section 110 has photographed the object O from multiple positions and the photography information that the photography information estimation section 120a has acquired. Here, FIG. 7 is a schematic block diagram showing a three-dimensional image processing apparatus 100D as a variation of the three-dimensional image processing apparatus 100 shown in FIG. 2. The multiple photo-image data may be estimated based on images and photography information photographed by other devices, instead of using images acquired by the photo-image data acquisition section 110.

As shown in FIG. 8, when the solid model acquisition section 130 is implemented as the solid model input section 130a and the photography information acquisition section 120 is implemented as the photography information estimation section 120a, part of the photographing environment information may be estimated from the photo-image data, as discussed, instead of being recorded at the image photographing time. The solid shape of the object O is available when the solid model input section 130a receives a user's operation, reads a recording medium for storing solid shape data, or receives solid shape data from an external apparatus through wire or wireless communication means. Here, FIG. 8 is a schematic block diagram showing a three-dimensional image processing apparatus 100D as a variation of the three-dimensional image processing apparatus 100 shown in FIG. 2. As discussed, this structure is suitable for the object O having a known solid shape, e.g., such as an industrial product, etc.

The area-divider 140 then designates areas made of the same material and surface finish on a solid model surface, and outputs it to the coloring information estimation section 150.

Figure 9:
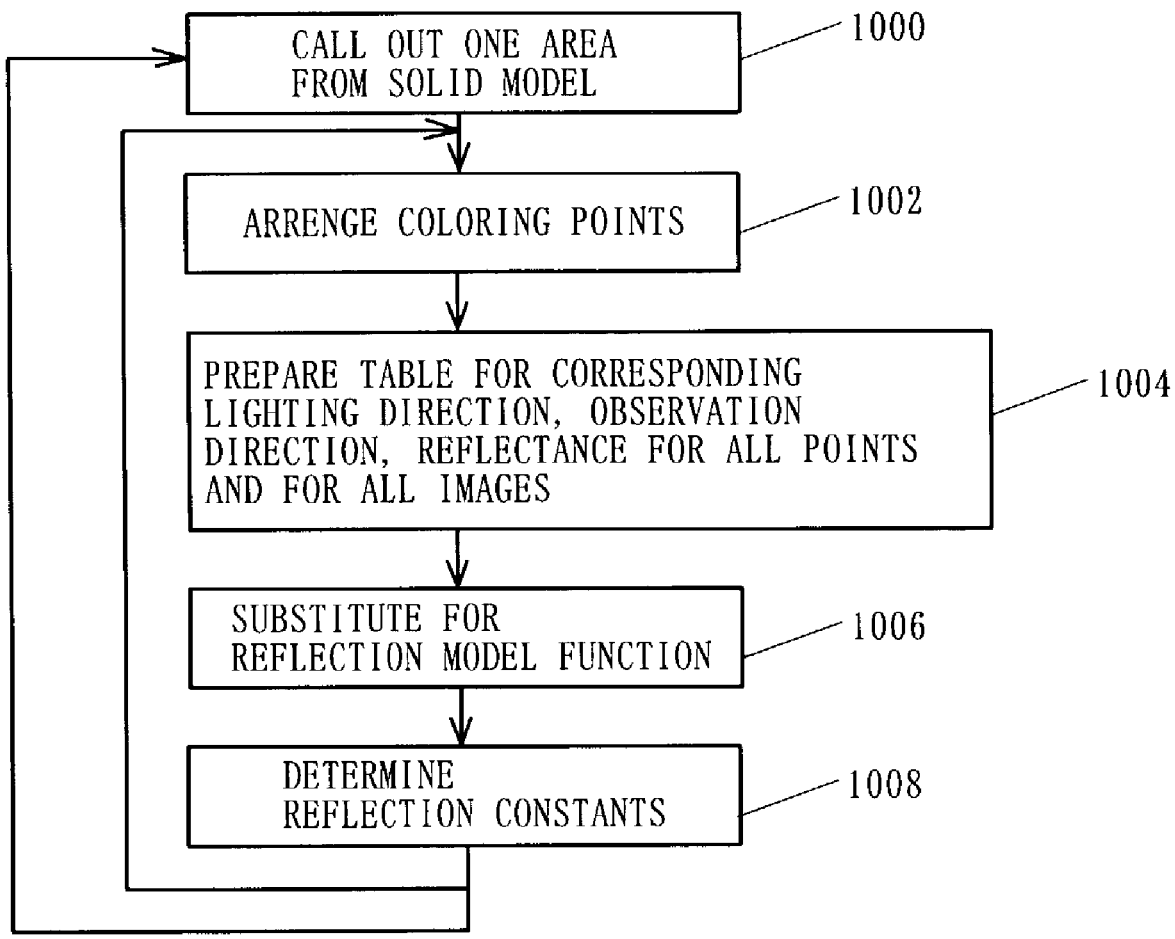
FIG. 9 is a flowchart for explaining an operation of a coloring information estimation section.

Referring to FIG. 9, the coloring information estimation section 150 estimates coloring information based on input information, and records obtained reflection model constants in the model data storage 160. Here, FIG. 9 is a flowchart for explaining an operation by the coloring information estimation section 150.

First, it obtains an area out of multiple areas designated by the area divider 140 (step 1000). Next, within such an area, it establishes a coloring point for representing a surface in the solid model of the object O (step 1002). Preferably, the coloring points cover the entire surface of the object O, and are set so densely that patterns and unevenness may be reproduced.

These coloring points and images are denoted by 1~h and 1~m where h is the number of coloring points in such an area and m is the number of images. For all the combinations of these coloring points and images, it calculates correspondences of lighting directions, observation directions, and reflectance, are prepares a table (step 1004). Step 1004 computes the lighting direction, observation direction, illuminance and positions on the image for the coloring points in a selected area based on arrangement information on the imaging apparatus 112, object O, and light source 114 at the time of photographing, and setup information on the light source 114 and imaging apparatus 112, and then divides the brightness on the image of the coloring point by the illuminance, thus obtaining the reflectance. In step 1004, if the element whose reflectance is unknown is not input in the table when the coloring point is located on a rear surface on the image, behind another part, outside of an image, or has too low illuminance.

Figure 10:
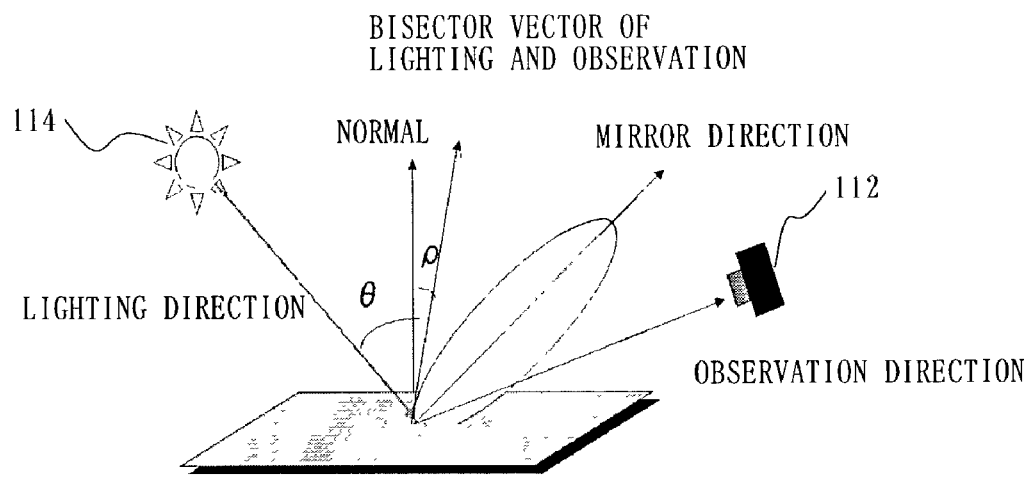
FIG. 10 is a figure for explaining angular variables θ and ρ.

The table is then referred to or substituted in a reflection model function, and each correspondence obtained in step 1004 is represented by the reflectance values $R_{ij}$, $G_{ij}$, and $B_{ij}$, per color band, and the angular parameters $\theta_{ij}$ and $\rho_{ij}$ shown in FIG. 10 (step 1006). Here, FIG. 10 is a view for explaining $\theta$ and $\rho$ in equation 1. A reflection model uses the Phong reflection model shown below as equation 1:

$$R = Cd_R \cos\theta + Cs \cos^n\rho$$
$$G = Cd_G \cos\theta + Cs \cos^n\rho \quad (1)$$
$$B = Cd_B \cos\theta + Cs \cos^n\rho$$

It is assumed that a first subscript i denotes a coloring point number, and a second subscript j denotes an image number. Where diffuse reflection constants of the element number i are $Cd_{R1}$, $Cd_{G1}$, and $Cd_{B1}$, the same specular reflection constants in an area are $C_s$ and n, and an error vector is $\epsilon$, the following determinant of equation 2 is given:

$$\begin{pmatrix} I_1 \\ I_2 \\ \vdots \\ I_h \end{pmatrix} = \begin{pmatrix} Fd_1 & 0 & \cdots & 0 & Fs_1 \\ 0 & Fd_2 & \cdots & 0 & Fs_2 \\ \vdots & \vdots & & \vdots & \vdots \\ 0 & 0 & \cdots & Fd_h & Fs_h \end{pmatrix} \begin{pmatrix} Cd_1 \\ Cd_2 \\ \cdots \\ Cd_h \\ Cs \end{pmatrix} + \varepsilon$$

$$I_i \equiv \begin{pmatrix} R_{i1} \\ G_{i1} \\ B_{i1} \\ R_{i2} \\ G_{i2} \\ B_{i2} \\ \vdots \\ R_{im} \\ G_{im} \\ B_{im} \end{pmatrix}, Fd_i \equiv \begin{pmatrix} \cos\theta_{i1} & 0 & 0 \\ 0 & \cos\theta_{i1} & 0 \\ 0 & 0 & \cos\theta_{i1} \\ \cos\theta_{i2} & 0 & 0 \\ 0 & \cos\theta_{i2} & 0 \\ 0 & 0 & \cos\theta_{i2} \\ \vdots & \vdots & \vdots \\ \cos\theta_{im} & 0 & 0 \\ 0 & \cos\theta_{im} & 0 \\ 0 & 0 & \cos\theta_{im} \end{pmatrix},$$

$$Fs_i \equiv \begin{pmatrix} \cos^n\rho_{i1} \\ \cos^n\rho_{i1} \\ \cos^n\rho_{i1} \\ \cos^n\rho_{i2} \\ \cos^n\rho_{i2} \\ \cos^n\rho_{i2} \\ \vdots \\ \cos^n\rho_{im} \\ \cos^n\rho_{im} \\ \cos^n\rho_{im} \end{pmatrix}, Cd_i \equiv \begin{pmatrix} Cd_{Ri} \\ Cd_{Gi} \\ Cd_{Bi} \end{pmatrix} \quad (i = 1 \ldots h)$$

When a coloring point has the unknown reflectance, a corresponding line should be removed from the determinant.

Then, a set of constants ($Cd_{R1}$, $Cd_{G1}$, $Cd_{B1}$, $Cd_{R2}$, $Cd_{G2}$, $Cd_{B2}$, ..., ..., $Cd_{Rh}$, $Cd_{Gh}$, $Cd_{Bh}$, $C_s$, n) that optimizes the error vector $\epsilon$ is calculated (step 1008), and recorded as reflection constants. Although there are various kinds of mathematical methods available for optimization, and the invention is not limited any of them. For example, for the least squares method, an evaluation function is calculated which provides the minimum self-inner product $\epsilon \cdot \epsilon$ of the error vector $\epsilon$. The evaluation function treats all the errors equivalently, but may consider reliability of respective values. Such a process continues for all the divided areas.

The CG producer 170, which generates and displays the object O by CG, computes the lighting direction, observation direction, and illuminance at each coloring point and displayed positions on the generated image, based on the information on an arrangement of the imaging apparatus 112, object O, and light source 114, setup information on the light source 114 and imaging apparatus 112, and a solid model recorded in the model data storage 160. The reflectance is calculated by substituting the lighting and observation directions and reflection model constants recorded in the model data storage 160 for the reflection model function. A product of the reflectance and illuminance is painted as a display color at the display position on the generated image, and is displayed on the CG display 180. The coloring point is not painted when located on a rear surface, behind another part, outside of the image, etc. Thus, the operator can obtain a desired CG image.

The above method computes so that areas in the same group, which are divided by the area divider 140, in the surface of the object O have the same specular reflection constant. Thus, even if there is part on the surface of the object O whose specular reflection has not been fully observed, the specular reflection constant is available given part in the same group whose specular reflection has been fully observed. Grouping multiple points having different normal directions would diversify lighting and photographing directions, which has the same effect as the increased number of images. This will provide a high quality CG image with small photography information content.

This embodiment has discussed a reflection model function using the Phong reflection model, but this invention does not limit a type of reflection model function. For example, a reflection model function, such as the Torrance-Sparrow model, is apparently viable if reflectance is given as a linear sum of a diffuse reflection component and a specular reflection component, and represented by multiple or a single constant and angular parameter. In addition, this embodiment has discussed an image made of the three RGB colors, but this invention is clearly applicable to one or more of these or other colors, polarized images, etc., if a corresponding reflection model function can be described. The above estimation does not always uniquely find all the reflection parameters, but may jointly apply a technique of complementing a parameter of an coloring point, which has not been found, with that of a neighboring coloring point, or representing with a typical value, etc.

The present three-dimensional image processing apparatus 100 may be a system including single or multiple apparatuses. Given multiple apparatuses, data is sent and received by various recording media and through wire or wireless data communication means. In particular, as exemplified in FIG. 11, there may be provided an element that serves as a model data acquisition section 210 just after the model data storage 160 to provide data stored in the model data storage 160 to a back-stage apparatus, and another device may serve as the CG generating and displaying section. Here, FIG. 11 is a block diagram showing a three-dimensional image processing apparatus 100F as a variation of the three-dimensional image processing apparatus 100 shown in FIG. 2. Such repetitive use of the model data once produced among multiple CG generating and displaying apparatuses would enhance the usefulness of the present invention.

A description will now be given of the second operation of the inventive three-dimensional image processing apparatus 100. The coloring information estimating section 150 estimates the coloring information based on input various information, and records the obtained reflection constants in the model data storage 160. Here, FIG. 12 is a flowchart for explaining an operation of the coloring information estimation section 150.

Figure 12:
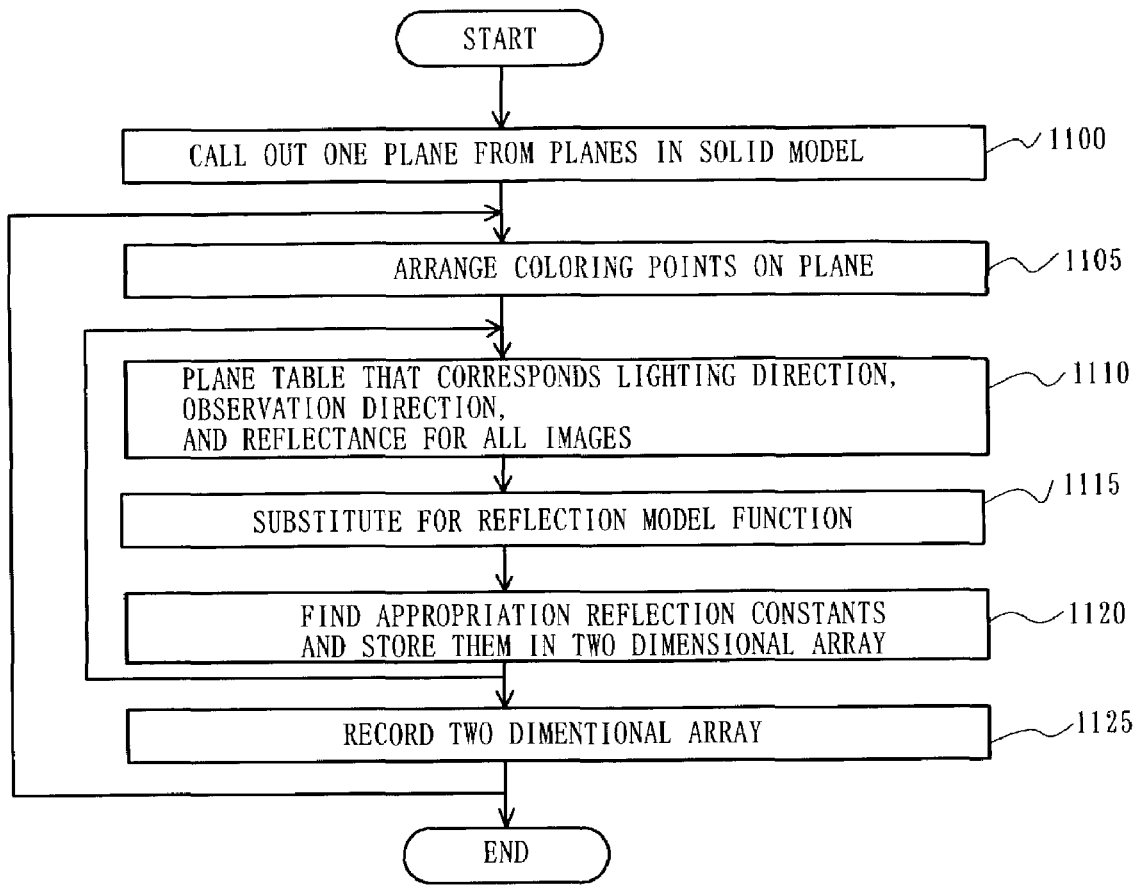
FIG. 12 is a flowchart for explaining an operation of the coloring information estimation section shown in FIG. 1.

Referring to FIG. 12, one of plains is obtained from a solid model (step 1100).

Figure 13:
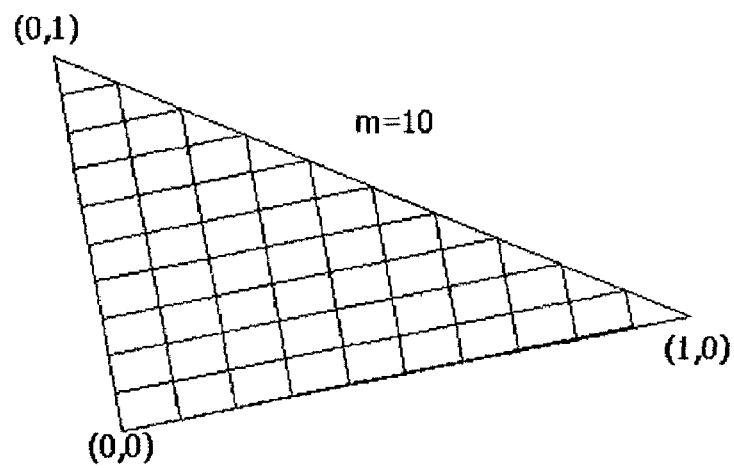
FIG. 13 is a typical view showing one plane taken by a solid model acquisition section.

Coloring points are then regularly arranged on the obtained plane (step 1105). For example, if the plane is a triangle, a coordinate system is set up such that respective vertices are (0, 0), (1, 0) and (0, 1) like lattice points in FIG. 13, and coloring point (i/m, j/m) (i=1, 2, ..., m, j=1, 2, ..., i) is positioned where m is an arrangement density of a coloring point. Here, FIG. 13 is a typical view showing one plane acquired by the solid model acquisition section 130. However, this invention does not limit a rule to arrange coloring points, but a regular arrangement of coloring points would save a necessity of preserving coordinates of coloring points one by one. As a result, if coloring points follow a certain rule, an arrangement rule does not matter.

A table is prepared after a lighting direction, and an observation direction and reflectance are calculated for one coloring point (step 1010). The table can be obtained from the photography information acquisition section 120. In other words, the lighting direction, an observation direction and illuminance, and positions on the image at each coloring point is calculated based on arrangement information on the imaging apparatus 112, object O, light source 114 at the time of photographing, and setup information on the light source 114 and imaging apparatus 112. A division of the brightness on the image by illuminance will produce reflectance. If an element on an image having unknown reflectance is removed from the table when the element is located on a backside, behind another part, or outside of an image, or has too low illuminance.

This table is then substituted for a reflection model function (step 1115). The reflection model function uses the Phong's reflection model shown in the above equation 1.

If it is assumed that diffuse reflection constants are $Cd_R$, $Cd_G$, and $Cd_B$, specular reflection constants are $C_s$, and n, and an error vector is $\epsilon$, then the following determinant shown may be given:

$$\begin{pmatrix} R_1 \\ G_1 \\ B_1 \\ R_2 \\ G_2 \\ B_2 \\ \vdots \\ R_m \\ G_m \\ B_m \end{pmatrix} = \begin{pmatrix} \cos\theta_1 & 0 & 0 & \cos^n\rho_1 \\ 0 & \cos\theta_1 & 0 & \cos^n\rho_1 \\ 0 & 0 & \cos\theta_1 & \cos^n\rho_1 \\ \cos\theta_2 & 0 & 0 & \cos^n\rho_1 \\ 0 & \cos\theta_2 & 0 & \cos^n\rho_1 \\ 0 & 0 & \cos\theta_2 & \cos^n\rho_1 \\ \vdots & \vdots & \vdots & \vdots \\ \cos\theta_m & 0 & 0 & \cos^n\rho_1 \\ 0 & \cos\theta_m & 0 & \cos^n\rho_1 \\ 0 & 0 & \cos\theta_m & \cos^n\rho_1 \end{pmatrix} \begin{pmatrix} Cd_R \\ Cd_G \\ Cd_B \\ Cs \end{pmatrix} + \varepsilon$$

A coloring point which has unknown reflectance is removed from the determinant.

A set of constants ($Cd_R$, $Cd_G$, $Cd_B$, $C_s$, n) that optimize the error vector $\varepsilon$ is calculated and stored in an array element that has indexes i and j in a two-dimensional array as diffuse reflection constants of the coloring point (step 1120). The optimization may use various sorts mathematical techniques, and the present invention does not limit an implementation of the optimization. For example, the least squares method when applied, may calculate a set that provides the minimum self-inner product $\varepsilon \cdot \varepsilon$ of error vector $\varepsilon$ in the evaluation function. The above evaluation function treats all errors equivalently, but may consider the reliability of each value.

The above process continues for all the coloring points on the plane, and a two-dimensional array that stores the reflection constants $Cd_R$, $Cd_G$, $Cd_B$, $C_s$, n is recorded in the model data storage 160 (step 1125). The above process continues for all the planes.

Thus, the model data storage 160 may hold all the model data necessary to reproduce the object O by CG. The model data in this embodiment has the following information for each plane:

(1) A three-dimensional coordinate of a plane's vertices for providing positions of the plane; and (2) A two-dimensional array that stores reflection model constants of all the coloring points on the plane.

A detailed description will be omitted of the reproduction and display of the object O since they are similar to the above.

Although the instant embodiment describes an image made of three RGB colors, the present invention is applicable other colors if a corresponding reflection model function can be described.

Although this embodiment uses the Phong's reflection model as a reflection model function, this technique is not limited to a reflection model function.

The coloring information estimation section 150 does not always estimate all reflection constants uniquely, but may overcome this problem by jointly using a method of using a reflection constant of an coloring point adjacent to another coloring point which has a unknown constant, or a method of substituting a typical value, etc.

A description will now be given of the third operation of the inventive three-dimensional image processing apparatus 100.

The photography information acquisition section 110 acquires photograph environment information at the time of photographing, which includes light source information relating to the light source 114, imaging apparatus information relating to the imaging apparatus 112, an eye point, the object O, a position and orientation of the light source 114, an arrangement of a camera, the object O, the light source 114, and the brightness of the light source 114 at the time of photographing. This information is output to the coloring information estimation section 150. As discussed, part of the photographing environment information may be estimated from photo-image data without being recorded at the time of photographing images.

The solid model acquisition section 130 acquires a solid model. At this time, each plane must be set up such that it does not extend over parts with different materials and surface finishes on the surface of the object O. Acquired solid model is output to the coloring information estimation section 150 and recorded in the model data storage 160.

The coloring information estimation section 150 estimates coloring information based on input information, and records obtained reflection constants into the model data storage 160. Here, FIG. 14 is a flowchart showing another operation of the coloring information estimation section 150 shown in FIG. 1.

Figure 14:
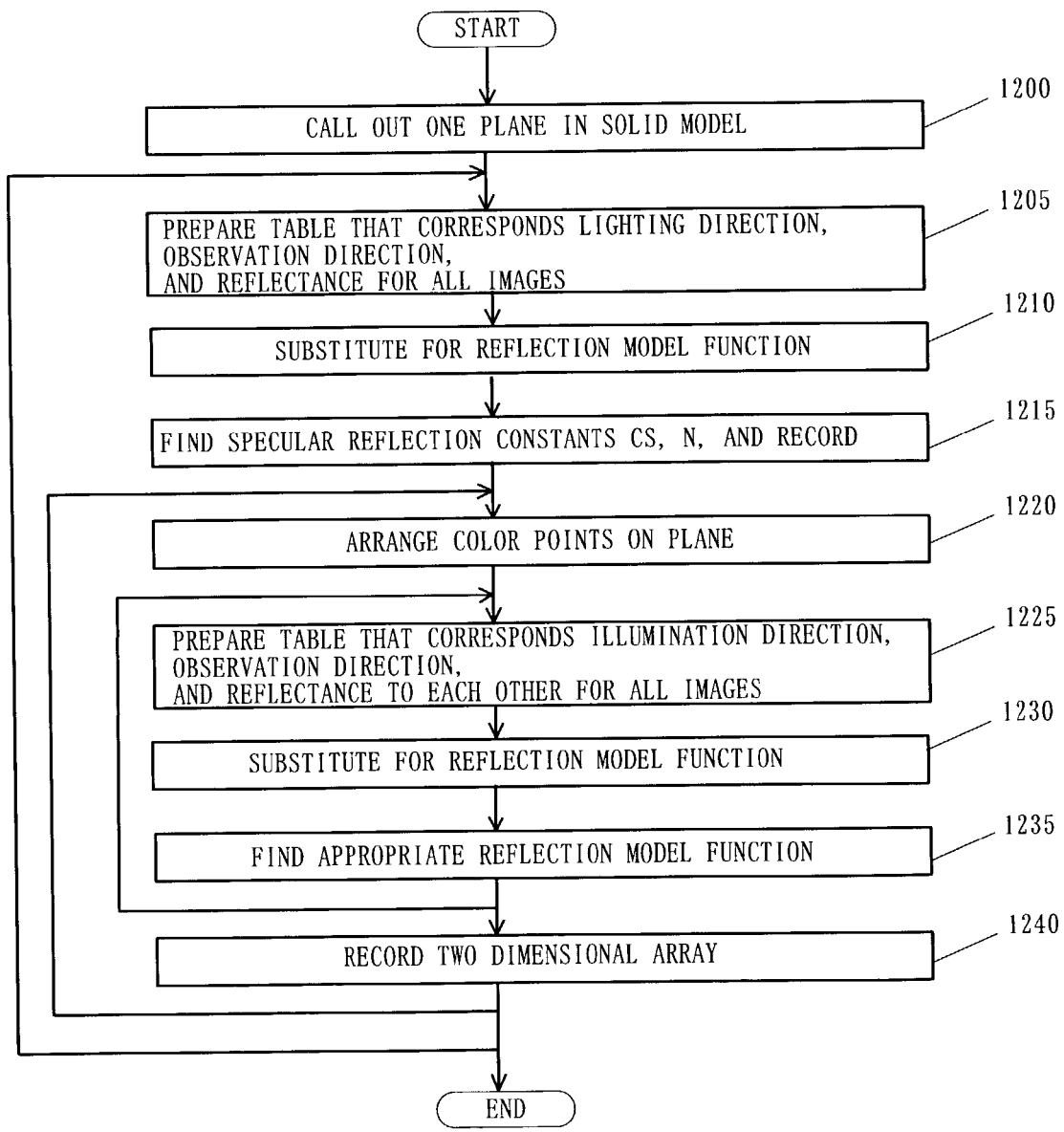
FIG. 14 is a flowchart for explaining another operation of the coloring information estimation section shown in FIG. 1.

Referring to FIG. 14, a plane is first obtained from the planes making up a solid model (1200). The respective images are denoted by numbers 1~M where M is the number of images. A table is prepared by calculating correspondences of the lighting direction, observation direction and reflectance for the obtained plane with respect to all the images (M images) (step 1205). This step may calculate the lighting direction, observation direction, and illuminance on the plane, and the position on the image, by using the photography information acquisition section 120, from the arrangement information on the imaging apparatus 112, object O, light source 114, setup information on the light source 114 and imaging apparatus 112. The reflectance is obtained by dividing the brightness on the image by illuminance. The element having unknown reflectance is removed from the table when the plane is located on a back side on the image, behind another part, outside of an image, or has too low illuminance.

This embodiment uses, unlike the above embodiment, a directional angle from a gravity center of the plane or a representative point regarded as the gravity point for the lighting and observation directions. The plane should be sufficiently smaller than a distance between the light source 114 and the imaging apparatus 112. The illuminance may use an average or integrated value within the plane, or an average of values of respective vertices, but may use the luminance at the representative point. An average value of a projection area of the plane when applied to the brightness on the image would restrain a measuring error.

This table is then substituted for the reflection model function (step 1210). The reflection model uses the Phong's reflection model shown in the above equations 1~3, and correspondences obtained in step 1205 are represented by average reflectance values $R_j$, $G_j$, $B_j$ for each color band within a plane and angular variables $\theta_j$ and $\rho_j$ shown in FIG. 10. Here, the subscript j denotes an image number. Where $Cd_R$, $Cd_G$, and $Cd_B$ average diffuse reflection constants in a plane, $C_S$ and n are specular reflection constants, which are same representative values within the plane, and $\varepsilon$ is an error vector, the following determinant is given:

$$\begin{pmatrix} R_1 \\ G_1 \\ B_1 \\ R_2 \\ G_2 \\ B_2 \\ \vdots \\ R_M \\ G_M \\ B_M \end{pmatrix} = \begin{pmatrix} \cos\theta_1 & 0 & 0 & \cos^n\rho_1 \\ 0 & \cos\theta_1 & 0 & \cos^n\rho_1 \\ 0 & 0 & \cos\theta_1 & \cos^n\rho_1 \\ \cos\theta_2 & 0 & 0 & \cos^n\rho_1 \\ 0 & \cos\theta_2 & 0 & \cos^n\rho_1 \\ 0 & 0 & \cos\theta_2 & \cos^n\rho_1 \\ \vdots & \vdots & \vdots & \vdots \\ \cos\theta_M & 0 & 0 & \cos^n\rho_1 \\ 0 & \cos\theta_M & 0 & \cos^n\rho_1 \\ 0 & 0 & \cos\theta_M & \cos^n\rho_1 \end{pmatrix} \begin{pmatrix} Cd_R \\ Cd_G \\ Cd_B \\ C_S \end{pmatrix} + \varepsilon$$

A set of constants ($Cd_R$, $Cd_G$, $Cd_B$, $C_S$, n) that optimizes the error vector $\epsilon$ is calculated, and $C_S$ and n are stored in the model data storage 160 as a (mirror plane) reflection constant of the plane (step 1215). The optimization may use various types of mathematical techniques, and the invention does not limit a type of the optimization. For example, the least squares method, if applied, may calculate a set that minimizes the self-inner product $\epsilon \cdot \epsilon$ of the error vector $\epsilon$ in the evaluation function. The above evaluation function treats all errors equivalently, but may consider the reliability of each value should be preferably be used.

Coloring points are then regularly arranged on the plane (step 1220). For example, if the plane is a triangle, a coordinate system is set up such that respective vertices are (0, 0), (1, 0) and (0, 1) like lattice points in FIG. 5, and coloring point (i/m, j/m) (i=1, 2, ..., m, j=1, 2, ..., i) is positioned where m is an arrangement density of a coloring point. However, this invention does not limit a rule to arrange coloring points, but a regular arrangement of coloring points would save a necessity of preserving coordinates of coloring points one by one. As a result, if coloring points follow a certain rule, an arrangement rule does not matter.

A table is prepared by calculating correspondences of the lighting direction, observation direction and reflectance for the obtained plane with respect to all the images (M images) (step 1205). A lighting direction, an observation direction, and illuminance may use values calculated in step 1205 as approximate values, or may be recalculated at the position of a coloring point. The brightness on the image uses the brightness of a projection part of a coloring point in the photo-image data.

This table is substituted for the reflection model function (step 1230). The reflection model uses the same model as in step 1210, and expresses the correspondences obtained in step 1110 using coloring point reflectance values $R_j$, $G_j$, $B_j$ per color band, and angular variables $\theta_j$ and $\rho_j$. The subscript j denotes an image number. When the lighting and observation directions use values calculated in step 1200 as approximate values, the angular variables $\theta_j$ and $\rho_j$ can use the values calculated in step 1110. Where $Cd_R$, $Cd_G$, and $Cd_B$ average diffuse reflection constants in the plane recorded in step 1120, $C_S$ and n are specular reflection constants, which are same representative values within the plane, and $\epsilon$ is an error vector, a determinant shown in equation 4 can be provided again. A coloring point having unknown reflectance is removed from the table.

A set of constants ($Cd_R$, $Cd_G$, $Cd_B$) is calculated which optimize the error vector $\epsilon$, and stored as diffuse reflection constants of the coloring point in an array element that has indexes i and j in a two-dimensional array (step 1235). The optimization may use various types of mathematical techniques of various, and the present invention does not limit a type of the optimization. Given the least squares method, as exemplarily used in step 1220, this calculation becomes a linear expression that is independent for respective color bands like equations 6~8 as shown below.

$$Cd_R = \frac{\sum_{j=1}^{m}(R_j - C_s\cos^n\rho_j)}{\sum_{j=1}^{m}\cos\theta_j} \tag{6}$$

$$Cd_G = \frac{\sum_{j=1}^{m}(G_j - C_s\cos^n\rho_j)}{\sum_{j=1}^{m}\cos\theta_j} \tag{7}$$

$$Cd_B = \frac{\sum_{j=1}^{m}(B_j - C_s\cos^n\rho_j)}{\sum_{j=1}^{m}\cos\theta_j} \tag{8}$$

Compared with estimation where a specular reflection constant is unknown, these linear expressions can be calculated very easily.

Thus, most of the actual objects are often the same materials and surface finishes within a permissible range, even when the base color delicately changes due to patterns and printing. In this range, diffuse reflection differs depending on a base color, but specular reflections are the same. Since quality sensation and glossy sensation are perceived in accordance with a state of highlight extent, a difference in specular reflections in a minute area is hard to be perceived. Taking advantage of this, the present invention makes calculation so as to have the same specular reflection constants in one or more planes where materials and surface finishes are the same. On the other hand, the diffuse reflection constant is considered for each coloring point regularly arranged in many numbers on each plane. As a result, only one set of specular reflection constants may be held in a plane, and it becomes possible to reproduce fine patterns and designs using the two-dimensional array of the diffuse reflection constants. As a specular reflection constant should be estimated once for each plane, an amount of calculations needed for estimation can be reduced.

The above process continues for all the coloring points on a plane, and the two-dimensional array in which the diffuse reflection constants are stored is recorded in the model data storage 160 (step 1240). The steps 1120~1140 repeat for all the planes.

Thus, the model data storage 160 may hold all the model data necessary to reproduce the object O by CG. The model data in this embodiment has the following information for each plane:

(1) A three-dimensional coordinate of plane's vertices for providing positions of a plane.

(2) One set of specular reflection constants.

(3) A two-dimensional array that stores reflection model constants for all the coloring points on a plane.

A detailed description will be omitted of the reproduction and display of the object O since they are similar to the above.

Although this embodiment describes an image made of three RGB colors, this invention is clearly applicable to other colors provided a corresponding reflection model can be described.

The above embodiment uses the Phong's reflection model for the reflection model function, but the present invention does not limit a reflection model function.

The estimation of the coloring information estimation section 150 does not always calculate all the reflection constants uniquely, but may overcome this problem by jointly using a method of using a reflection constant of an coloring point adjacent to another coloring point whose constant has not been found, a method of substituting a typical value, etc.

Computer programs are also independent merchandise, which execute the inventive coloring information adding method and three-dimensional computer graphics processing method may be stored in a FD or another computer readable medium, and/or distributed online through the Internet or other networks.

As discussed, the present invention regards a object surface shape as a set of planes, and regularly arranges coloring points onto a plane that provide coloring information, thereby eliminating the necessity of retaining a coordinate for each individual point. This will reduce the coloring information content and thus the amount of computation for estimation and reproduction.

What is claimed is:

1. A method for adding coloring information to a solid model of an object, the method comprising the steps of:
   acquiring a solid model for forming a surface shape of the object from a set of multiple planes; and
   estimating coloring information at the plane, wherein said estimating step comprises the steps of:
   regularly arranging multiple coloring points on the plane; and
   calculating coloring information of the coloring point as constants in a predetermined function based on photo-image data photographed of the object illuminated by a light source and photography information of the photo-image data, and storing the calculated constants as a two-dimensional array corresponding to an arrangement of the coloring point,
   wherein the predetermined function comprises a lighting direction, an observation direction for photographing, and the constant as an element of the predetermined function, and wherein the predetermined function is expressed by a linear sum of a diffuse reflection component and a specular reflection component, and the constants are a diffuse reflection constant related to the diffuse reflection component and a specular reflection constant related to the specular reflection component.

2. A method according to claim 1, wherein the photography information includes information on an illumination method, which includes lighting directions and illuminance, information about a method for the photographing device, and information on positions and postures about the photographing device, the object and the light source.

3. A method according to claim 1, wherein the photo-image data is a set of images comprising multiple images photographed such that lighting and/or observation directions relative to the object is different.

4. A method according to claim 2, wherein at least one of the lighting direction, the observation direction and the illuminance in the photography information may be approximated as a common value to coloring points in the plane.

5. A method according to claim 4, wherein the common value is a value of the lighting direction, the observation direction or the illuminance at a gravity center or at a point regarded as the gravity center on the plane.

6. A method according to claim 4, wherein the common value is an integral or average value of the lighting direction, observation direction or illuminance on the plane.

7. A method according to claim 4, wherein the common value is a value of the lighting direction, observation direction or illuminance at representative points on the plane.

8. A method according to claim 2, wherein the lighting direction, the observation direction and/or the illuminance in the photography information may be approximated by an interior division value of representative points on the plane.

9. A method according to claim 8, wherein when the plane is polygonal, the representative points are vertices of the polygon.

10. A method according to claim 1, wherein said storing step stores the diffuse reflection constants into the two-dimensional array, and a common value as a specular reflection constant is stored in one plane.

11. A method according to claim 1, wherein said storing step stores the diffuse reflection constants into the two-dimensional array, a common value as a specular reflection constant is stored in the multiple planes.

12. A method according to claim 10, wherein the common value as the specular reflection constant corresponds to a representative value of the lighting direction, observation direction and illuminance, and a representative value of brightness of an image.

13. A method according to claim 12, wherein the representative value of the lighting direction, observation direction, and illuminance is a common value to coloring points in the plane.

14. A method according to claim 12, wherein the representative value of the brightness of the image is a value obtained by integrating or averaging the brightness of the image in the photo-image data onto a projection area of the plane.

15. A method according to claim 1, wherein the diffuse reflection constant stored at the coloring point is calculated using a value of the specular reflection constant.

16. A method according to claim 1, wherein said storing step stores the diffuse reflection constants into the two-dimensional array, and values at representative points in the plane for the specular reflection constant.

17. A method according to claim 16, wherein the diffuse reflection constant stored in the coloring point is calculated by interior-dividing the specular reflection constant at the representative points.

18. A method according to claim 16, wherein when the plane is polygonal, the representative points are respective vertices of the polygon.

19. A method according to claim 1, wherein the plane in the solid model is established such that it does not extend over different materials or different surface finishes on the surface of the object.

20. A method for adding coloring information to a solid model of an object, the method comprising the steps of:
    acquiring a solid model for forming a surface shape of the object from a set of multiple planes; and
    estimating coloring information at the plane, wherein said estimating step comprises the steps of:
    regularly arranging multiple coloring points on the plane; and calculating coloring information of the coloring point as constants in a predetermined function based on photo-image data photographed of the object illuminated by a light source and photography information of the photo-image data, and storing the calculated constants as a two-dimensional array corresponding to an arrangement of the coloring point, wherein the photography information includes information on an illumination method, which includes lighting directions and illuminance, information about a method for the photographing device, and information on positions and postures about the photographing device, the object and the light source, wherein at least one of the lighting direction, the observation direction and the illuminance in the photography information may be approximated as a common value to coloring points in the plane, and wherein the common value is an integral or average value of the lighting direction, observation direction or illuminance on the plane.

* * * * *